United States Patent Office 3,067,076
Patented Dec. 4, 1962

3,067,076
STABILIZED AMMONIUM NITRATE PROPELLANT COMPOSITIONS CONTAINING SALTS OF ETHYLENEDIAMINETETRAACETIC ACID
Walter W. Butcher, Whiting, Ind., and Wayne A. Proell, Chicago, Ill., assignors to Standard Oil Company, Chicago, Ill., a corporation of Indiana
No Drawing. Filed Dec. 8, 1960, Ser. No. 75,051
4 Claims. (Cl. 149—19)

This invention relates to gas-generating compositions or propellants which are based upon ammonium nitrate as the oxidizer.

For use as a gas-generator material or a propellant for rockets, ammonium nitrate must be formed into shapes which maintain their configuration. These shapes (grains) are attained by admixing the ammonium nitrate with a matrix former or binder. Gas-generator compositions must produce gas at a uniform rate; therefore, to the grain there is added a catalyst adapted for promoting the burning of the ammonium nitrate. Particularly when the binder contains a cellulose ester such as cellulose acetate as a major component, the ammonium nitrate composition tends to evolve gas on long storage at elevated temperatures. The Armed Forces must store gas-generators and propellants over the entire surface of the earth. It is common for storage buildings in the tropics to reach temperatures of 150° F. In order to meet these conditions, the Armed Forces require ammonium nitrate propellants to be storage stable at temperatures on the order of 170° F. for a period of one year.

Gas-generating or propellant compositions of the invention consist essentially of ammonium nitrate, an oxidizable organic binder material, a catalyst adapted for promoting the burning rate of the composition, and a gas evolution stabilization additive adapted for increasing the storage stability of the composition at elevated atmospheric temperatures, which additive is a salt of ethylenediaminetetraacetic acid and a nitrogen base.

The improved stabilized composition of the invention contains ammonium nitrate as the major component. The ammonium nitrate may be ordinary commercial ammonium nitrate such as is used for fertilizers. This commercial grade material contains a small amount of impurities and the particles are usually coated with moisture resisting material such as paraffin wax. Military grade ammonium nitrate which is almost chemically pure is particularly suitable. The ammonium nitrate is preferably in a finely divided particulate form which may be either produced by prilling or by grinding. The ammonium nitrate is the major component of the gas-generator composition and usually the composition will contain between about 55 and 80 percent of ammonium nitrate. (It is to be understood that all percentages set out herein are percent by weight of the total composition.)

In order to permit the shaping of the ammonium nitrate composition into definite configurations, a matrix former or binder material is present. When ammonium nitrate decomposes, free-oxygen is formed. Advantage of the existence of this free-oxygen is taken, and oxidizable organic materials are used as the binders. The multi-component binder or matrix former commonly consists of a polymeric base material and a plasticizer therefor. Particularly suitable polymeric base materials are cellulose esters of alkanoic acids containing from 2 to 4 carbon atoms such as cellulose acetate, cellulose acetate butyrate and cellulose propionate; the polyvinyl resins such as polyvinylchloride and polyvinyl acetate are also good bases; styreneacrylonitrile is an example of a copolymer which forms a good base material; polyacrylonitrile is another suitable base material. In general, the binder contains between about 15% and 45% of the particular polymeric base material.

The plasticizer component of the binder is broadly defined as an oxygenated hydrocarbon; i.e., where the oxygen is in chemical combination. The hydrocarbon base may be aliphatic or aromatic or may contain both forms. The oxygen may be present in the plasticizer in ether linkage and/or hydroxyl group and/or carboxyl groups; also the oxygen may be present in inorganic substituents, particularly nitro groups. In general, any plasticizer which is adopted to plasticize the particular polymer may be used in the invention. Exemplary classes of plasticizers which are suitable are set out below. (It is to be understood that these classes are illustrative only and do not limit the types of oxygenated hydrocarbons which may be used to plasticize the polymer.)

Di-lower alkyl-phthalates, e.g., dimethyl phthalate, dibutyl phthalate dioctyl phthalate and dimethyl nitrophthalate.

Nitrobenzenes, e.g., nitrobenzene, dinitrobenzene, nitrotoluene, dinitrotoluene, nitroxylene, and nitrodiphenyl.

Nitrodiphenyl ethers, e.g., nitrodiphenyl ether and 2,4-dinitrodiphenyl ether.

Tri-lower alkyl-citrates, e.g., triethyl citrate, tributyl citrate and triamyl citrate.

Acyl tri-lower alkyl-citrates where the acyl group contains 2–4 carbon atoms, e.g., acetyl triethyl citrate and acetyl tributyl citrate.

Glycerol-lower alkanoates, e.g., monoacetin, triacetin, glycerol tripropionate and glycerol tributyrate.

Lower alkylene-glycol-lower alkanoates wherein the glycol portion has a molecular weight below about 200, e.g., ethylene glycol diacetate, triethylene glycol dibexoate, triethylene glycol dioctoate, polyethylene glycol diactoate, dipropylene glycol diacetate, nitromethyl propanediol diacetate, hydroxyethyl acetate and hydroxy propyl acetate (propylene glycol monoacetate).

Dinitrophenyl-lower alkyl-lower alkanoates, e.g., dinitrophenyl ethylacetate, and dinitrophenyl amyloctoate.

Lower alkylene-glycols wherein the molecular weight is below about 200, e.g., diethylene glycol, polyethylene glycol (200), and tetrapropylene glycol.

Lower alkylene-glycol oxolates, e.g., diethylene glycol oxolate and polyethylene glycol (200) oxolate.

Lower alkylene-glycol maleates, e.g., ethylene glycol maleate and bis-(diethylene glycol monoethyl ether) maleate.

Lower alkylene-glycol diglycollates, e.g., ethylene glycol diglycollate and diethylene glycol diglycollate.

Miscellaneous diglycollates, e.g., dibutyl diglycollate, dimethylalkyl diglycollate and methylcarbitol diglycollate.

Lower alkyl-phthalyl-lower alkyl-glycollate, e.g., methyl phthalyl ethyl glycollate, ethyl phthalyl ethyl glycollate and butyl phthalyl butyl glycollate.

Di-lower alkyloxy-tetraglycol, e.g., dimethoxy tetra glycol and dibutoxy tetra glycol.

Nitrophenylether of lower alkylene glycols, e.g., dinitrophenyl ether of triethylene glycol and nitrophenyl ether of polypropylene glycol.

Nitrophenoxy alkanois wherein the alkanol portion is derived from a glycol having a molecular weight of not more than about 200. These may be pure compounds or admixed with major component bis(nitrophenoxy) alkane.

A single plasticizer may be used; more usually two or more plasticizers are used in conjunction. The particular requirements with respect to use will determine not only the polymer but also the particular plasticizer or combination of plasticizers which are used.

The mixture of ammonium nitrate, polymeric base and oxygenated hydrocarbon is essentially as insensitive to shock as is ammonium nitrate itself. It is extremely difficult to get this particular mixture to burn. Smooth burning it attained by the addition of a catalyst to the mixture. This catalyst is distinguished from the well-known sensitizers. For example, nitro starch or nitroglycerine may be added to ammonium nitrate in order to increase its sensitivity to shock and enable it to be more easily detonated for explosive use. Catalysts as a class do not promote sensitivity and are used to cause the ammonium nitrate composition to burn, for example like a cigarette. The effectiveness of the catalyst is in general measured by its ability to impart a finite burning rate to a strand of ammonium nitrate composition. The burning rate is specified as inches per second at a given pressure and temperature; usually these burning rates are obtained by a bomb procedure operating at 1000 p.s.i. and about 75° F. temperature.

Many catalysts which promote the burning of ammonium nitrate compositions are known. The inorganic chromium salts form the best known classes of catlysts. The better known members of this class are ammonium chromate, ammonium polychromate, the alkali metal chromates and polychromates, chromic oxide, chromic nitrate, and copper chromite. Ammonium dichromate is the most commonly used chromium salt. Various hydrocarbon amine chromates such as ethylene diamine chromate and piperidine chromate are also excellent chromium catalyst. Certain heavy metal cyanides, particularly those of cobalt, copper, lead, nickel, silver and zinc are effective catalysts. The cyanamides of barium, copper, lead mercury and silver are effective catalysts. The various Prussian blues are excellent catalysts.

In addition to the above primarily inorganic catalysts, various organic catalysts are known. The organic catalysts are particularly useful when it is desired to have combustion products which are gases or vapors and thereby do not erode gas exit orifices. Two catalysts which do not contain any significant amount of metal components are pyrogene blue (Color Index 956–961) and methylene blue. Particularly suitable catalysts are the alkali metal barbiturates and alkali metal anthanilates.

The catalysts are present in the composition in an amount determined by its use and also by the particular catalyst. In general between about 0.1 and 12 percent of catalyst is present and more usually between about 1 and 7 percent.

In addition to the main components, i.e., ammonium nitrate, binder and catalyst, the composition may contain other materials. For example, materials may be present to improve low temperature ignitability, for instance oximes or asphalt may be present. Surfactants may be present in order to improve the coating of the nitrate with the binder and to improve the shape retention characteristics of the composition. Various burning rate promoters, such as finely divided carbon, which are not considered to be true catalyst, may also be present.

It has been discovered that a composition containing ammonium nitrate, a polymeric base, particularly a cellulose ester, an oxygenated hydrocarbon adapted to plasticize the polymeric base, and a burning rate catalyst may be effectively stabilized against gas evolution during storage at elevated atmospheric pressures by the addition of a salt of ethylenediaminetetraacetic acid, and of a nitrogen base. Illustrative examples of suitable nitrogen bases from which the salt may be made are ammonia ($NH_3$); ammonium hydroxides; hydrazine; quaternary ammonium hydroxides, such as tetramethyl ammonium hydroxide, tetraethyl ammonium hydroxide, tetrapropyl ammonium hydroxide, ethyl trimethyl ammonium hydroxide, and phenyl trimethyl ammonium hydroxide; the aliphatic amines, such as the primary, secondary and tertiary amines having methyl, ethyl, propyl, isopropyl, butyl, isobutyl, pentyl and hexyl radicals, e.g., methyl amine, methyl ethyl amine, triisopropyl amine; naphthenic amines, such as cyclohexyl amine (hexahydroaniline); particularly those having 1–10 carbon atoms per molecule, the aromatic amines, such as phenyl amine (aniline) diphenyl amine, toluidine, xylidine, and mesidine; mixed aliphatic-aromatic amines, such as phenyl methyl amine and tolyl ethyl amine, wherein both the aliphatic and aromatic radicals are adapted directly to the nitrogen atom; and also mixed aliphatic-aromatic amines, such as benzyl amine, where the aromatic nucleus is separated from the nitrogen atom by an alkyl group; heterocyclic amines, such as pyridine and quinoline; and aliphatic, naphthenic and aromatic diamines, such as ethylene diamine, hexamethylene diamine and benzidine (4,4'-biphenyl diamine). Ammonium hydroxide and hydrazine are particularly suitable nitrogen bases from which to form a salt of ethylenediaminetetraacetic acid.

It is desirable that the salt used give a neutral or somewhat alkaline pH when dissolved in water.

The salts may be prepared by mixing in an aqueous solution the acid with the desired nitrogen base, evaporating the liquid therefrom, and drying the resulting salt. Evaporating and drying temperatures of not higher than about 300° F. are preferred, in order that the salt not decompose. The salts also may be prepared reaction in an organic solvent, such as an alcohol, and filtering and drying the resultant precipitant.

The amount of the above-described salt to be used in an ammonium nitrate composition is determined by the stability of the particular composition. Both the specified storage time and the specified temperature at which the composition must remain stable have a bearing on the amount of the salt to be used in the composition. In general, increasing the amount of burning catalyst in the composition requires an increase in the amount of salt necessary to maintain constant gas evolution characteristics. Normally, the amount of salt used will be between about 0.1 and about 10 weight percent, more normally between about 1 and 4 percent.

The above-described salt may also be used in conjunction with other known gas evolution stabilization additives, such as aromatic amines, e.g., toluene diamine, diamine phenyl amine, naphthalene, and toluene triamine, and/or a morpholine, such as N-phenylmorpholine, or a morpholine having an alkyl-substituted phenyl group, such as N-tolylmorpholine. In compositions which are particularly difficult to stabilize, use of both an aromatic amine and a phenylmorpholine together with an above-described salt is advantageous. The amounts of these additional gas evolution stabilization compounds used may range between about 0.1 and 5 percent, usually 0.5 to 2 percent.

It is to be noted that the aromatic amine used as a supplemental gas evolution stabilization additive may be the same compound, or of the same structural class of compounds, as the nitrogen base used to prepare the above-described salt, e.g., toluene diamine.

Broadly the composition will contain between about 20 and 35 weight percent of binder when the polymeric base material is a cellulose ester of an alkanoic acid containing 2 to 4 carbon atoms and an oxygenated hydrocarbon plasticizer therefor. A particularly useful composition consists of cellulose acetate, about 6–12%; acetyltriethylcitrate, about 6–12%; a mixture having two to four parts of dinitrophenoxyethanol to one part of bis(di-nitrophenoxy)ethane, about 6–12; carbon, about 2–4%; toluene diamine, about 0.5%; N-phenylmorpholine, about 0.5%; an ammonium salt of ethylenediaminetetraacetic acid; about 1–4%; and catalyst, about 1–4%.

TESTS

Four ammonium nitrate-type compositions were tested for burning rate, storage stability, and other characteristics required by military specifications.

Each composition was prepared by mixing together for one hour in a laboratory mixer a 300-gram batch having ingredients in the proportions indicated in the table set forth below. The mixing temperature was about 100° C. Lacquer grade commerical cellulose acetate analyzing about 55 percent of acetic acid equivalent was the polymer base. Two plasticizers were used. One plasticizer contained about three parts of dinitrophenoxy ethanol and one part of the bis(dinitrophenoxy)ethane, obtained by the reaction of dinitrochlorobenzene and ethylene glycol in the presence of aqueous sodium hydroxide solution. The other plasticizer was acetyl triethyl citrate. Two compositions contained 3% of sodium barbiturate and two contained 3% potassium barbiturate as a burning rate catalyst. Composition B contained 1% and D contained 3% of tetra ammonium salt of ethylenediaminetetraacetic acid as a gas evolution stabilization additive.

After mixing the resulting pasty mass was compression molded into a slab approximately one-half inch in thickness. The slab was subsequently sawed into strips for the burning rate test and broken into small pieces for the storage stability test.

The burning rate tests were conducted in a Crawford Bomb pressured at 1000 p.s.i.g. and 25° C.

The high temperature storage stability of the compositions was determined in a laboratory test as follows. A small sample, about three grams, of the composition was placed in a vessel connected by tubing to a mercury manometer system which was so arranged that differential readings of the manometer were translatable into volume changes in the system. Since volume change of the composition sample itself can be disregarded, the volume change in the system corresponds to the amount of gaseous decomposition products from the sample. The vessel was inserted into a metal block provided with electrical heating elements and controls which permit the block to be maintained at a temperature of 150° C. A period of 15 minutes was allowed for the sample to come to the temperature of 150° C., at which time the manometer was zeroed. While the sample was maintained at 150° C., the time (induction period) was measured between the zeroing of the manometer and the time when the gas evolution rate reached one cc. per gram per hour. Also the time was measured between the zeroing of the manometer and the time at which a gas evolution rate of 10 cc.'s per gram per hour was reached.

The following table summarizes the ingredients of each composition tested and the results of the high temperature stability tests conducted thereon:

Table I

| Composition | A | B | C | D |
|---|---|---|---|---|
| Ingredients, weight percent: | | | | |
| Ammonium nitrate | 62.0 | 61.0 | 61.0 | 59.0 |
| Cellulose acetate | 10.2 | 10.2 | 10.2 | 9.9 |
| Defined phenoxy cpds | 10.2 | 10.2 | 10.2 | 9.9 |
| Defined citrate | 11.6 | 11.6 | 11.6 | 11.3 |
| Carbon black | 3.0 | 3.0 | 3.0 | 3.0 |
| Toluene diamine | | | 0.5 | 0.5 |
| N-phenyl morpholine | | | 0.5 | 0.5 |
| Sodium barbiturate | 3.0 | 3.0 | | |
| Potassium barbiturate | | | 3.0 | 3.0 |
| Defined additive | | 1.0 | | 3.0 |
| Totals | 100.0 | 100.0 | 100.0 | 100.0 |

TEST RESULTS

| | A | B | C | D |
|---|---|---|---|---|
| Induction Period, hours | 0.3 | 3.8 | 1.3 | 4.5 |
| Time to gas evolution rate of 10 cc./g./hr., hours | 1.2 | 5.3 | 2.7 | 7.1 |

Thus having described the invention, what is claimed is:

1. A composition consisting essentially of (*a*) about 55–80 weight per cent of ammonium nitrate, (*b*) an oxidizable organic binder material consisting essentially of a polymeric base selected from the class consisting of cellulose esters of alkanoic acids containing from 2 to 4 carbon atoms, polyvinyl chloride, polyvinyl acetate, polyacrylonitrile and styrene-acrylonitrile and plasticizer adapted for plasticizing said polymeric base, (*c*) about 0.1–12 weight percent of a catalyst adapted for promoting the burning of said ammonium nitrate and (*d*) about 0.1–10 weight percent of a salt of (i) ethylenediaminetetraacetic acid and (ii) a nitrogen base selected from the class consisting of ammonium hydroxide, quaternary ammonium hydroxide, alkylamines having 1–10 carbon atoms, phenylamines, heterocylic amines, hydrazines and mixtures thereof.

2. The composition of claim 1 wherein said salt is an ammonium salt.

3. The composition of claim 1 wherein said salt is derived from alkyl amines having between one and about ten carbon atoms per molecule.

4. A composition consisting essentially of (*a*) ammonium nitrate, (*b*) cellulose acetate, about 6–12%, (*c*) acetyl triethyl citrate, about 6–12%, (*d*) about 6–12% of an about 3:1 mixture of dinitrophenoxyethanol and bis(dinitrophenoxy)ethane, (*e*) carbon, about 2–4%, (*f*) alkali metal barbiturate catalyst, about 1–4%, (*g*) toluene diamine, about 0.5%, (*h*) N-phenylmorpholine, about 0.5%, and (*i*) an ammonium salt of ethylenediaminetetraacetic acid, about 1–4%.

No references cited.